(12) United States Patent
Gupta et al.

(10) Patent No.: US 12,015,668 B2
(45) Date of Patent: *Jun. 18, 2024

(54) METHOD AND APPARATUS FOR SELECTING A TARGET EDGE APPLICATION SERVER IN AN EDGE COMPUTING ENVIRONMENT

(71) Applicant: SAMSUNG ELECTRONICS CO., LTD., Suwon-si (KR)

(72) Inventors: Nishant Gupta, Bangalore (IN); Basavaraj Jayawant Pattan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,650

(22) Filed: Apr. 17, 2023

(65) Prior Publication Data
US 2023/0254369 A1  Aug. 10, 2023

Related U.S. Application Data

(63) Continuation of application No. 17/818,269, filed on Aug. 8, 2022, now Pat. No. 11,652,882, which is a
(Continued)

(30) Foreign Application Priority Data

Jul. 23, 2020  (IN) .............................. 202041031594
Jul. 9, 2021  (IN) .............................. 202041031594

(51) Int. Cl.
*H04L 67/1095* (2022.01)
*H04L 67/1008* (2022.01)
(Continued)

(52) U.S. Cl.
CPC ...... *H04L 67/1095* (2013.01); *H04L 67/1008* (2013.01); *H04L 67/148* (2013.01); *H04W 4/025* (2013.01); *H04W 4/50* (2018.02)

(58) Field of Classification Search
None
See application file for complete search history.

(56) References Cited

U.S. PATENT DOCUMENTS 9,507,630 B2   11/2016  Addepalli et al.
9,917,908 B1   3/2018   Knecht
(Continued)

FOREIGN PATENT DOCUMENTS

WO   2019011408 A1   1/2019

OTHER PUBLICATIONS

Spiess et al., "Reliable execution of business processes on dynamic networks of service-enabled devices", Jun. 1, 2009, IEEE, 2009 7th IEEE International Conference on Industrial Informatics (pp. 533-538) (Year: 2009).*

(Continued)

*Primary Examiner* — Davoud A Zand

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method performed by a source edge enabler server for selecting a target edge application server in an edge computing system for a user equipment (UE) is provided.

20 Claims, 9 Drawing Sheets

Related U.S. Application Data continuation of application No. 17/383,268, filed on Jul. 22, 2021, now Pat. No. 11,463,519.

(51) Int. Cl.
*H04L 67/148* (2022.01)
*H04W 4/02* (2018.01)
*H04W 4/50* (2018.01)

(56) References Cited

U.S. PATENT DOCUMENTS

| | | | |
|---|---|---|---|
| 10,499,304 | B1 | 12/2019 | Stauffer et al. |
| 10,568,007 | B2* | 2/2020 | Park ............... H04W 36/0077 |
| 10,986,622 | B2* | 4/2021 | Zhang ................ H04L 5/0094 |
| 10,991,242 | B2 | 4/2021 | Taylor |
| 2012/0278385 | A1 | 11/2012 | Papakipos et al. |
| 2013/0332996 | A1* | 12/2013 | Fiala ................. H04W 12/35 709/227 |
| 2015/0100667 | A1 | 4/2015 | Freyria et al. |
| 2015/0120555 | A1* | 4/2015 | Jung .................... G06Q 50/01 705/44 |
| 2017/0195891 | A1 | 7/2017 | Smith et al. |
| 2018/0018508 | A1 | 1/2018 | Tusch |
| 2019/0191341 | A1 | 6/2019 | Trang et al. |
| 2020/0045519 | A1 | 2/2020 | Raleigh et al. |
| 2020/0178198 | A1 | 6/2020 | Ding et al. |
| 2021/0007149 | A1* | 1/2021 | Li ..................... H04L 27/0006 |
| 2021/0007166 | A1 | 1/2021 | Liao et al. |
| 2021/0105338 | A1 | 4/2021 | Oyman et al. |
| 2021/0195541 | A1* | 6/2021 | Wei .................... H04W 56/005 |

OTHER PUBLICATIONS

International Search Report and Written Opinion of the International Searching Authority dated Oct. 27, 2021, in connection with International Application No. PCT/KR2021/009484, 8 pages.

3GPP TR 23.758 V17.0.0 (Dec. 2019), Technical Report, 3rd Generation Partnership Project; Technical Specification Group Services and System Aspects; Study on application architecture for enabling Edge Applications; (Release 17), Dec. 2019, 113 pages.

3GPP TS 23.558 V0.3.0 (Jun. 2020), Technical Specification, 3rd Generation Partnership Project; Technical Specification Group Services and System Aspects; Architecture for enabling Edge Applications; (Release 17), Jun. 2020, 70 pages.

Binsahaq et al., "A Survey on Autonomic Provisioning and Management of QoS in SDN Networks", Jan. 1, 2019, IEEE, IEE Access (vol. 7, pp. 73384-73435).

3rd Generation Partnership Project; Technical Specification Group Services and System Aspects; System architecture for the 5G System (5GS); Stage 2 (Release 16), 3GPP TS 23.501 V16.5.0 (Jul. 2020), 441 pages.

Zhang, "Signaling-Based Optimization", Jan. 1, 2017, IEEE, Wiley—IEEE Press 2017 (Edition: 1, pp. 780-801), Year: 2017.

Supplementary European Search Report dated Jun. 22, 2023, in connection with European Patent Application No. 21845986.5, 8 pages.

Decision of Patent dated Sep. 1, 2023, in connection with Korean Patent Application No. 10-2022-7029986, 9 pages.

Communication pursuant to Article 94(3) EPC dated Oct. 23, 2023, in connection with European Patent Application No. 21845986.5, 6 pages.

Supplementary European Search Report dated Feb. 5, 2024, in connection with European Patent Application No. 23204637.5, 9 pages.

Office Action issued Mar. 4, 2024, in connection with Korean Patent Application No. 10-2023-7037545, 9 pages.

Office Action issued Jan. 29, 2024, in connection with Korean Patent Application No. 10-2022-7029986, 6 pages.

\* cited by examiner

METHOD AND APPARATUS FOR SELECTING A TARGET EDGE APPLICATION SERVER IN AN EDGE COMPUTING ENVIRONMENT

CROSS-REFERENCE TO RELATED APPLICATIONS

The present application is a continuation of application Ser. No. 17/818,269 filed Aug. 8, 2022, which is a continuation of application Ser. No. 17/383,268, now U.S. Pat. No. 11,463,519 issued Oct. 4, 2022, filed Jul. 22, 2021, which is based on and claims priority to Indian Provisional Application No. 202041031594 filed on Jul. 23, 2020, and Indian Non-Provisional Application No. 202041031594 filed on Jul. 9, 2021, the disclosures of which are herein incorporated by reference in their entirety.

BACKGROUND

1. Field

The present disclosure relates to edge computing and more specifically the invention relates to a method and a User Equipment (UE) for selecting a target Edge Application Server (EAS) for service continuity in an edge computing environment.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human-centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In an edge computing environment, if a UE is moving, eventually a server which optimally served the UE will not be optimal anymore. This could be due to an increased distance of the server from the UE due to the UE's changing location. In another case the server may get overloaded, or crashes, and therefore the server is unable to fulfill the performance requirements of application clients in the UE. In such scenarios, the UE is expected to switch from the current server, called as a source server, to a new optimal server, called a target server.

In a densely deployed area where multiple edge server options are available, multiple target servers are available that could potentially be the optimal target server. The selection of the target server from the potential target servers should ideally be the responsibility of an Edge Enabler Client (EEC) in the UE, as it is aware of the preferences of the user and the application clients in the UE, which communicate with the target server. But with an edge enabler layer in a place, there could be many entities, including entities in the network or the edge that can detect a need of service continuity. In such scenarios it is not apparent as to how the target server is selected while taking the user and application preferences and performance requirements (Key Performance Indicators, KPIs) into account.

SUMMARY

Accordingly, the embodiments herein comprise a method for selecting a target Edge Application Server (EAS) in an edge computing system for a user equipment (UE), the method comprising sending, by an Edge Enabler Client (EEC) in the UE, a selection criteria for an Application Client in the UE to a source Edge Enabler Server (EES) for selecting the target EAS, determining by the source Edge Enabler Server, a need for an application context transfer for an application client in the UE, selecting by the source Edge Enabler Server (EES), the target Edge Application Server for the application context transfer based on the selection criteria received from the Edge Enabler Client, and sending by the source Edge Enabler Server (EES), a notification to the Edge Enabler Client about the selected target Edge Application Server and target Edge Enabler Server associated with the target Edge Application Server.

In certain embodiments, determining by the source Edge Enabler Server (EES) the need for application context transfer for the Edge Enabler Client comprises one of monitoring by the source Edge Enabler Server (EES), a change in location of the UE; receiving by the source Edge Enabler Server (EES), a request for UE application context transfer from the Edge Application Server (EAS); receiving by the source Edge Enabler Server (EES), a request for UE application context transfer from the Edge Enabler Client; and monitoring by the source Edge Enabler Server (EES), an overload condition in a source Edge Application Server.

In another embodiment the selection criteria are shared by the Edge Enabler Client as part of an initial registration request to the source Edge Enabler Server. In another embodiment, the selection criteria are shared by the Edge Enabler Client as part of the Edge Application Server discovery request to the Edge Enabler Server.

In yet another embodiment, the selection criteria include one of application client expected KPIs and Application Client minimum KPIs. The expected KPIs denote the expected performance in order for the Application Clients to receive currently required services from the EAS; and the minimum KPIs denote the minimum performance in order for the Application Clients to receive meaningful services from the EAS.

In yet another embodiment, the selection criteria are related to one of a particular application or plurality of applications at the UE.

In certain embodiments, the method further comprises sending by the Edge Enabler Client, an acknowledgement message to the source Edge Enabler Server triggering an application context transfer procedure; and initiating by the source Edge Enabler Server, the application context transfer of the Edge Enabler Client with the selected Edge Application Server.

In certain embodiments, selecting the target Edge Application Server for the application context transfer based on the selection criteria by the source Edge Enabler Server comprises sending, by the source Edge Enabler Server, a request to the Edge Configuration Server to determine the potential target Edge Enabler Server, serving the Edge Application Server that the Edge Enabler Client requires based on the selection criteria; receiving, by the source Edge Enabler Server, a list of potential target Edge Application Server from the Edge Configuration Server in response to the request; sending, by the source Edge Enabler Server (252a), a request to one of the received Edge Enabler Server (252) to determine the potential target Edge Application Server (254), that the Edge Enabler Client (220) requires based on the selection criteria; receiving, by the source Edge Enabler Server (252), a list of potential target Edge Application Server (254) from at least one of the potential Edge Enabler Server (252) in response to the request; and selecting, by the source Edge Enabler Server, the target Edge Application Server for the application context transfer from the received potential target Edge Application Servers based on the selection criteria.

In yet another embodiment, the target Edge Application Server is selected by the Edge Enabler Client at the UE.

These and other aspects of the embodiments herein will be better appreciated and understood when considered in conjunction with the following description and the accompanying drawings. It should be understood, however, that the following descriptions, while indicating explanatory embodiments and numerous specific details thereof, are given by way of illustration and not of limitation. Many changes and modifications may be made within the scope of the embodiments herein without departing from the spirit thereof and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
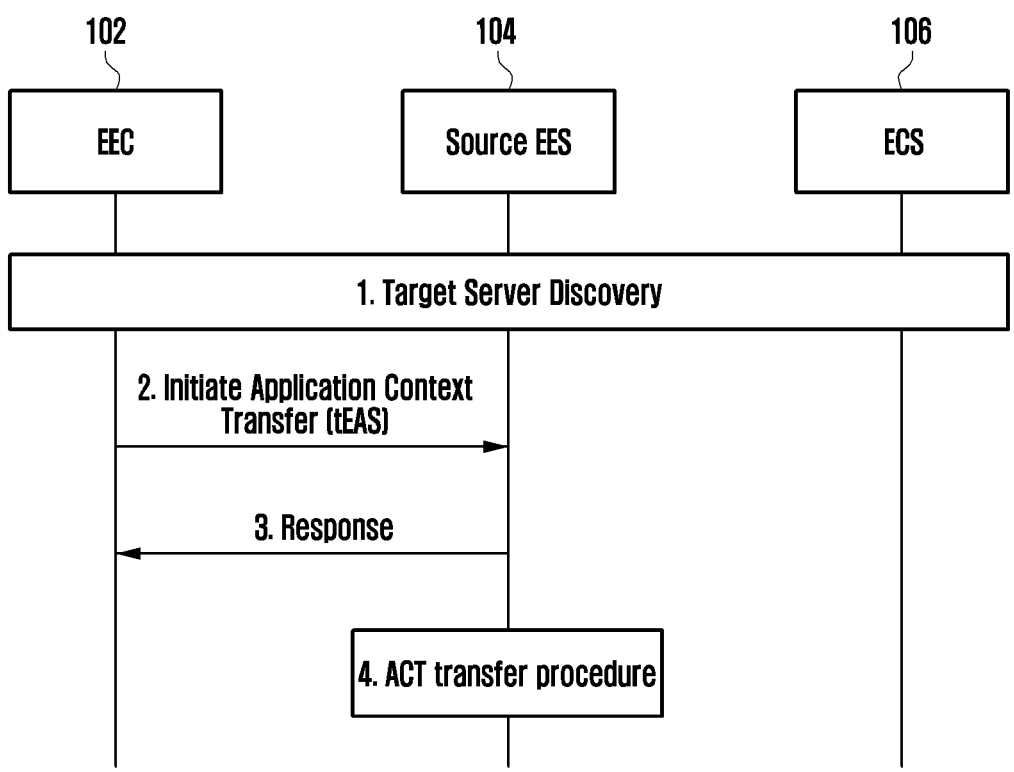
FIG. 1 is a sequence diagram illustrating an example of an Edge Enabler Client (EEC) detecting a need of Application Context Transfer (ACT) and providing a target Edge Application Server (EAS) to a source Edge Enabler Server (EES), according to various embodiments of this disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually, exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

In this disclosure, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the present disclosure is not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein provide a different method and a UE which facilitate selection of a target server in different scenarios, by taking a user and application preferences and Application Client KPIs into account. The KPIs indicate a performance capacity of the server for example a storage space that is available at the server. In some embodiments, the KPIs may be a CPU/GPU, an available memory, a maximum round-trip time, a rate of requests the server can handle and the like.

When the UE is responsible for determining a need of a service continuity, the Edge Enabler Client (EEC) upon determining the need of an application context transfer discovers available target servers and selects the optimal one based on preferences of the user and/or an application client. To discover available target server, the EEC performs service provisioning and Enabler Application Server (EAS) discovery procedures to select the preferred target server from a list of discovered EAS. Further the method includes providing details of the target server to an Edge Enabler Server (EES) to initiate continuity procedures with the selected server.

However, in some scenarios, it can be advantageous for a server, namely, the Edge Enabler Server or the Edge Application Server, to be responsible for determining the need of the service continuity. In some embodiments, methods according to this disclosure provide that the Edge Enabler Server take into account the preferences of the Edge Enabler Client (EEC) and the Application Client to which the EES is serving, in order to select the appropriate target server for maintaining the continuity of the service by fulfilling the preferences and KPI requirements of the Application Client.

For clarity and better understanding of the specification, the scope of certain terms used in this disclosure should be construed, without limitation, to encompass the descriptions provided below.

Application Client: An application resident in the UE performing a client function.

Edge Enabler Client (EEC): An enabling layer entity in the UE to assist the Application Client with an edge related functionality.

Edge Enabler Server (EES): An enabling layer entity in an edge to assist the Edge Enabler Client (EEC) with an edge related functionality.

Edge Configuration Server (ECS): An enabling layer entity in a wireless network to assist the Edge Enabler Client (EEC) in discovering and connecting with the Edge Enabler Server.

Edge Application Server (EAS): An application server resident in the edge.

Source Edge Enabler Server (EES): An Edge Enabler Server currently serving the Edge Enabler Client.

Source Edge Application Server (EAS): An Edge Application Server currently serving the Application Client.

Target Edge Enabler Server: The Edge Enabler Server that will serve the Edge Enabler Client after the service continuity/transfer of the application context.

Target Edge Application Server: The Edge Application Server that will serve the Application Client after the service continuity/transfer of the application context.

Target server: An optimal target Edge Application Server, in case the continuity of the service needs to maintained between two Edge Application Servers, or a cloud server if the continuity of the service needs to be maintained between the Edge Application Server and a cloud Application Server.

In this disclosure, the terms "service continuity" and "Application Context Transfer (ACT)" may be used interchangeably, to refer to procedures wherein the user's application context is moved or transferred from a server to a new server to maintain continuity of the service when the application connects to the new server.

In this disclosure, the terms "Application Context Transfer (ACT)" and "Application Context Relocation (ACR)" may also be used interchangeably. ACT refers to the actual transfer of Application Context between the Application Servers. ACT is a part of the process called ACR, for continuation of service across Application Servers.

In certain embodiments, the Edge Enabler Client in FIGS. 3 through 8 can he replaced with a source Edge Application Server to help select the target Edge Application Server.

Referring now to the drawings, and more particularly to FIGS. 1 through 8, where similar reference characters denote corresponding features consistently throughout the figures, there are shown preferred embodiments.

FIG. 1 is sequence diagram illustrating an example of an Edge Enabler Client (EEC) (102) detecting a need of an Application Context Transfer (ACT) and providing a target Edge Application Server (EAS) (106) to a source Edge Enabler Server (EES) (104), according to the certain known embodiments.

Referring to FIG. 1, an EEC (102) upon determining the need for the ACT, discovers and selects the target EAS (106). Further, the EEC (102) provides information of the determined target EAS (106) to the source Edge Enabler Server (104) in order to initiate the application context transfer with the target EAS (106).

Thus, as seen the existing arts do not discloses taking into consideration the preferences of the user and the application clients in the UE when the need of ACT is detected by the source EES.

Thus, it is desired to address the above-mentioned disadvantages or other shortcomings or at least provide a useful alternative.

Certain embodiments described herein address the above-described issues by providing a method and a UE for providing a selection criteria to a source EES for selecting an optimal target server for service continuity based on preferences of a user and application clients in the UE, Various embodiments as described herein provide a method and device for selecting the optimal target server for service continuity based on the preferences of the user and the application clients in the UE using an EEC.

Various embodiments as described herein send a target EAS selection criteria by the EEC to a source EES, such that the source EES is aware about the preferences, such as KPI requirements, of the user and the application clients in the UE even before detection of a need for an ACT.

Figure 2:
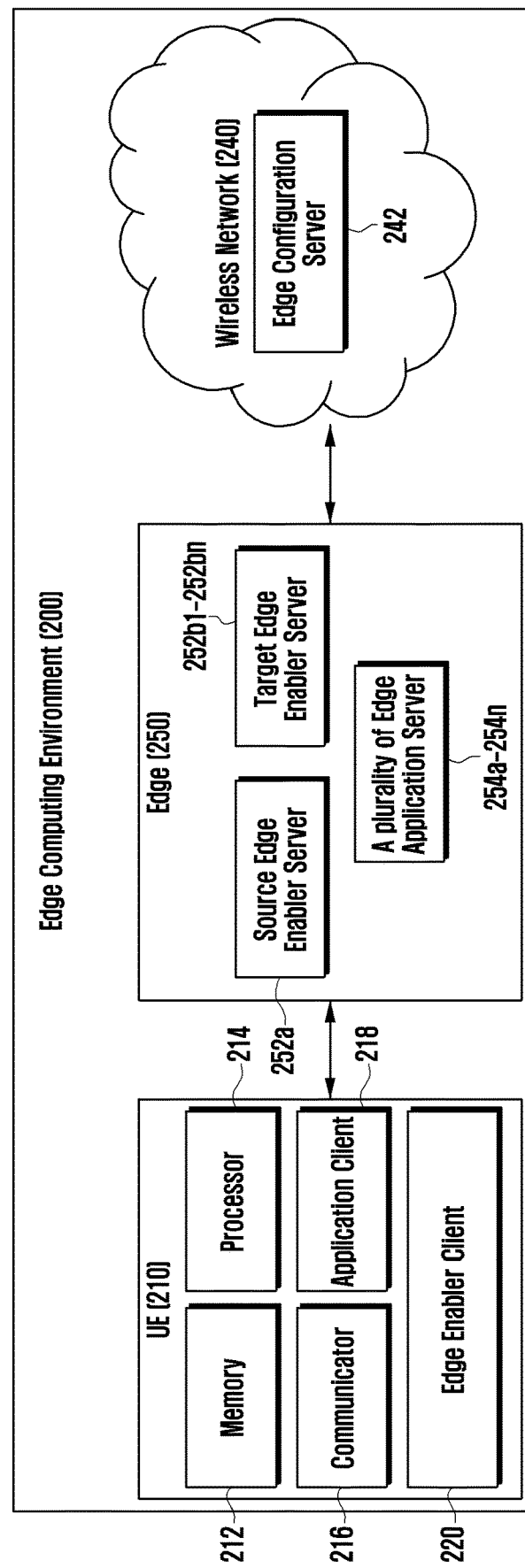
FIG. 2 illustrates, in block diagram format, an example of a UE in an edge computing system and wherein the UE provides selection criteria for searching an optimal target server based on an ACT request, according to certain embodiments as disclosed herein.

FIG. 2 illustrates, in block diagram format, an example of a UE (210) in an edge computing environment (230) and wherein the UE (210) is responsible for providing selection criteria for searching for an optimal target server based on an ACT request, according to certain embodiments as disclosed herein.

Referring to the illustrative example of FIG. 2, an edge computing system (200) comprises a UE (210) communicating with a wireless network (240) through an edge (250).

The UE (210) may be, for example, a mobile device, a smart watch, a cellular phone, a smart phone, a Personal Digital Assistant (PDA), a tablet computer, a laptop computer, an Internet of things (IoT) device, an Artificial intelligence (AI) device or the like.

In certain embodiments, the UE (210) includes a memory (212), a processor (214), a communicator (216), an application client (218) collectively referenced and an Edge Enabler Client (220).

The wireless network (240) comprises an Edge Configuration Server (ECS) (242).

The edge (250) comprises an Edge Enabler Server (EES) (252) and a plurality of Edge Application Servers (EAS) (254a-254n). In certain embodiments, the EES (252) serving the UE (210) is termed as a source EES. In some embodiments, the EAS serving the UE (210) is termed as a source EAS. In certain embodiments edge (250) denotes the Edge Data Networks as defined by the 3GPP TS 23.558 technical standard.

In certain embodiments, the memory (212) in the UE (210) stores instructions to be executed by the processor (214) for selecting the optimal target EAS from the plurality of target EAS (254a-254n).

The memory (212) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (212) may, in some examples, be considered a non-transitory storage medium. The term "non-transitory" may indicate that the storage medium is not embodied in a carrier wave or a propagated signal. However, the term "non-transitory" should not be interpreted that the memory (212) is non-movable. In some examples, the memory (212) can be configured to store larger amounts of information than the memory. In certain examples, a non-transitory storage medium may store data that can, over time, change (e.g., in Random Access Memory (RAM) or cache). The memory (212) can be an internal storage, or it can be an external storage unit of the UE (210), a cloud storage, or any other type of external storage.

In certain embodiments, the processor (214) communicates with the memory (212), the communicator (216), the plurality of applications client (218), and the Edge Enabler Client (220).

The processor (214) is configured to execute instructions stored in the memory (212), including instructions for selection of the optimal target EAS from the plurality of target EAS (254a-254n).

The processor (214) may include one or a plurality of processors, be a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

In certain embodiments, the communicator (216) is configured for communicating internally between internal hardware components and with external devices via one or more networks. The communicator (216) includes an electronic circuit specific to a standard that enables wired or wireless communication.

The plurality of application clients (218a-218n) in the UE (210) are applications either stored or currently running on the UE (210). The plurality of application clients (218a-218n) may include, for example, a streaming service application, a music application, a gaming application, and a social networking application.

Information about the application clients (218a-218n) is maintained by the Edge Enabler Client (220) at the UE (210).

The EEC (220) at the UE (210), tracks information about a service required by the different applications in the UE (210) and accordingly determines a need for an Application Context Transfer (ACT). The EEC (220) then sends ACT information to the source EES (252) present in the edge (250).

In certain embodiments, a user of the UE (210) may be using either one or more applications from the plurality of application clients (218a-218n). For example, if the user is viewing a video on the streaming application, then a service requirement of a network providing data to UE (210) is to provide uninterrupted video streaming with a best quality to the user. However, the user of the UE (210) may move to a different location while watching the video. In such a case, the EAS (254) to which the UE (210) is currently connected may cease to be the optimal EAS for the UE (210) at its new location. In order to achieve seamless video streaming, the UE (210) needs to connect to another optimal EAS.

In certain embodiments, the source EES (252) present in the edge (250) sends a request to the EEC (220) to determine the target EAS (254) upon detecting the ACT. The request from the source EES (252a) also acts as a notification or an indication to the Edge Enabler Client to (220) for preparing the Application Client (218) for a service continuity.

On receiving the request from the source Edge Enabler Server (252), the Edge Enabler Client (220) determines a potential target Edge Application Server (254). Once the Edge Enabler Client (220) has a list of potential targets, it uses the preferences of the user and the Application Client (218) along with KPI requirements of the Application Client (218) to select the optimal target Edge Application Server (254).

The Edge Enabler Client (220) sends details of the selected optimal target Edge Application Server (254) with which application context transfer should be initiated.

The source Edge Enabler Server (252) takes the information received from the EEC (220) into account and initiates application context transfer procedures with the selected target Edge Application Server (EAS) (254).

In certain embodiments, selection of the optimal target EAS (254) is performed by the source EES (252) present in the edge (250) upon detecting the ACT received from the EEC (220), wherein the potential target EAS (254) are selected by the EES (252).

In various embodiments, upon determining that the service continuity (i.e., ACT) is needed, the source Edge Enabler Server (220) contacts the Edge Configuration Server (242) to push a service provisioning update notification to the Edge Enabler Client (220). The service provisioning update notification comprises a list of potential target Edge Enabler Servers. Further, the source Edge Enabler Server (252) requests the Edge Enabler Client (220) to provide the selected Edge Application Server (254) for the application context transfer.

In some embodiments, the Edge Enabler Client (220) prepares a selection criteria to select the target Edge Application Server (254) in an event where the service continuity may be required. The selection criteria could be for a particular application or may apply to multiple applications. The Edge Enabler Client (220) utilizes the preferences of the user and Application Clients (218), including the KPI requirements of the Application Clients (218). Once prepared, the Edge Enabler Client (220) shares this selection criterion with the Edge Enabler Server (252). In some embodiments, the selection criteria can be shared by the Edge Enabler Client (220) as part of its registration request to the Edge Enabler Server (252). The Edge Enabler Server (252) stores the received criteria, and sends a response confirming receipt of the selection criteria. Further, the Edge Enabler Server (252) uses the criteria to determine the target Edge Application Server (254) in scenarios where the service continuity is needed.

Thus, as seen above, methods and devices according to various embodiments disclosed herein take into consideration the preference of the user and the applications.

Although FIG. 2 illustrates a given set of hardware components of the UE (210), but it is to be understood that other embodiments are possible and within the contemplated scope of this disclosure. In some embodiments, the UE (210) may include additional or fewer components than those shown in the Figure. Further, the labels or names of the components are used only for illustrative purpose and does not limit the scope of the disclosure. One or more components can be combined together as part of an architecture for performing functions of selecting the optimal target EAS from the plurality of target EAS (254a-254n).

Figure 3:
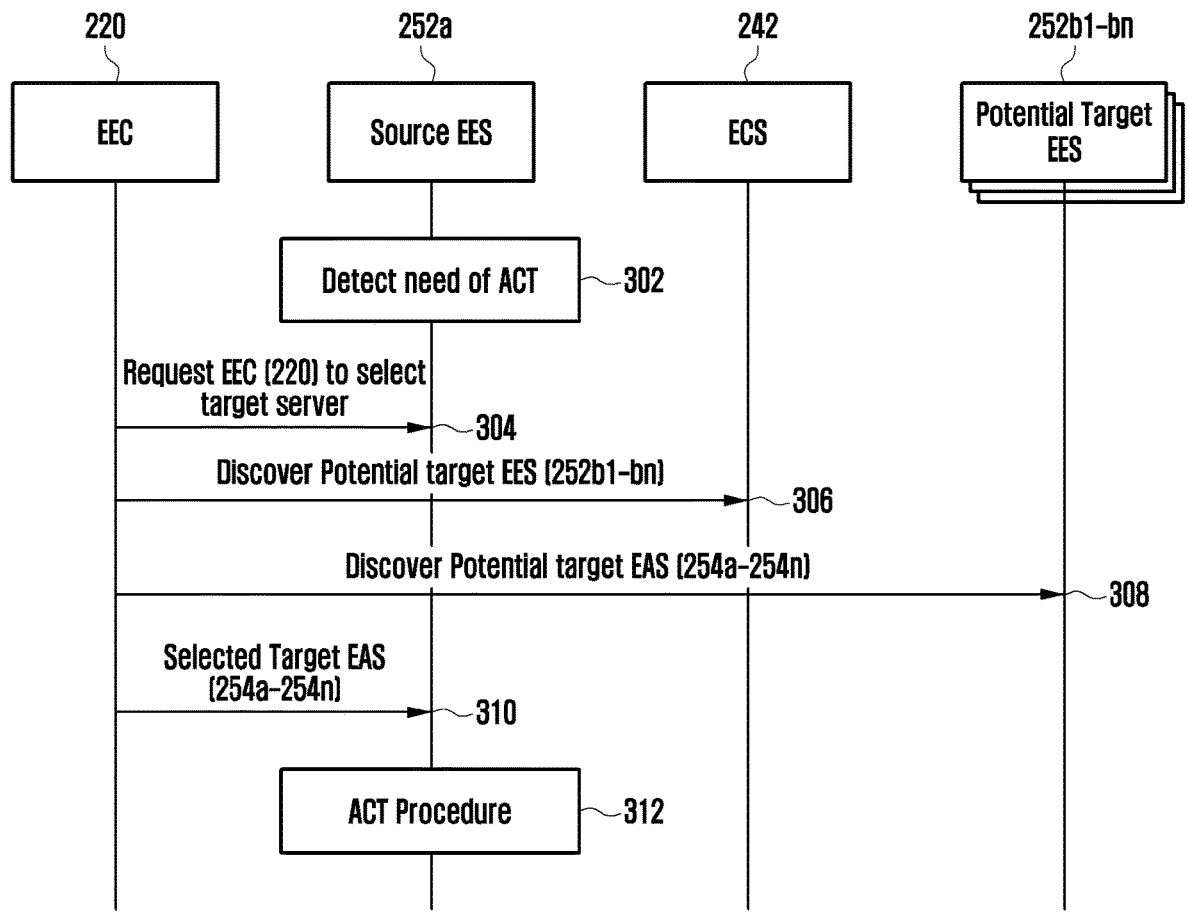
FIG. 3 is a sequence diagram illustrating an example of a source Edge Enabler Server requesting the Edge Enabler Client to provide the target Edge Application Server details, according to some embodiments as disclosed herein.

FIG. 3 is a sequence diagram illustrating an example of the source Edge Enabler Server (252) requesting the Edge Enabler Client (220) to provide the target Edge Application Server details, according to some embodiments as disclosed herein.

Referring to the illustrative example of FIG. 3, the source Edge Enabler Server (252), upon determining that the service continuity is needed, requests the Edge Enabler Client (220) to discover and select the target Edge Application Server (254) to which the application context should be transferred. Upon receiving the information of the selected target Edge Application Server (254) from the Edge Enabler Client (220), which may include the information of the target Edge Enabler Server also, the source Edge Enabler Server (252) performs the application context transfer procedure according to the operations described below.

At operation 302, the source Edge Enabler Server (252a) detects the need for an application context transfer. In certain embodiments, the need for an application context transfer could be a result of a change in a location of the UE (210) detected by the source Edge Enabler Server (252) with or without help of the wireless network (240). In certain embodiments, the need for an application context transfer could be a result of a request from the source Edge Enabler Server (252a) or a request from the Edge Enabler Client (220) itself. In various embodiments the need for an application context transfer is based on certain events monitored by the source Edge Enabler Server (252a), like overload in source Edge Application Server (254). The above-mentioned scenarios are just some examples of how the source Edge Enabler Server (252a) detects the need for service continuity.

At operation 304, upon determining the need for an application context transfer, the source Edge Enabler Server (252a) sends a request to the Edge Enabler Client (220) to determine the target Edge Application Server (254) for transferring the application context. This request also acts as a notification or an indication to the Edge Enabler Client (220) to prepare the Application Client (218) for the service continuity.

At operation 306, upon receiving the request from the source Edge Enabler Server (252), the Edge Enabler Client (220) uses service provisioning procedures and an EAS discovery procedures as required, to determine the potential target Edge Enabler Server (252b1-252bn) and the potential target Edge Application Server (254) at operation 308. The provisioning procedures and the EAS discovery procedures are as provided in the 3GPP TS 23.558.

Once the Edge Enabler Client (220) has a list of potential targets, it uses the preferences of the user and the Application Client (218) along with the KPI requirements of the Application Client (218) to select the optimal target Edge Application Server (254) and, if required, the target Edge Enabler Server (252b1-252bn).

The Edge Enabler Client (220) in its response to the source Edge Enabler Server (252) includes the details of the selected optimal target Edge Enabler Server (254) or the target Edge Application Server (254) with which the application context transfer should be initiated at operation 310.

At operation 312, the source Edge Enabler Server (252) takes the information provided in step 310 into account and initiates the application context transfer procedures with the selected optimal target Edge Application Server (254).

In some embodiments, the source Edge Enabler Server (252a), as described in FIG. 3 is replaced with the target Edge Enabler Server (252b1-252bn). In such embodiments, the need for the Edge Enabler Client (220) to request for service provisioning (operation 306 i.e., discovering target Edge Enabler Servers), may be avoided. Also, if needed, the target Edge Enabler Server (252b1-252bn) provides a list of potential target Edge Application Servers (254) in its request to the Edge Enabler Client (220). In such embodiments, the Edge Enabler Client (220) may not need to perform potential target Edge Application Server discovery according to operation 308.

Figure 4:
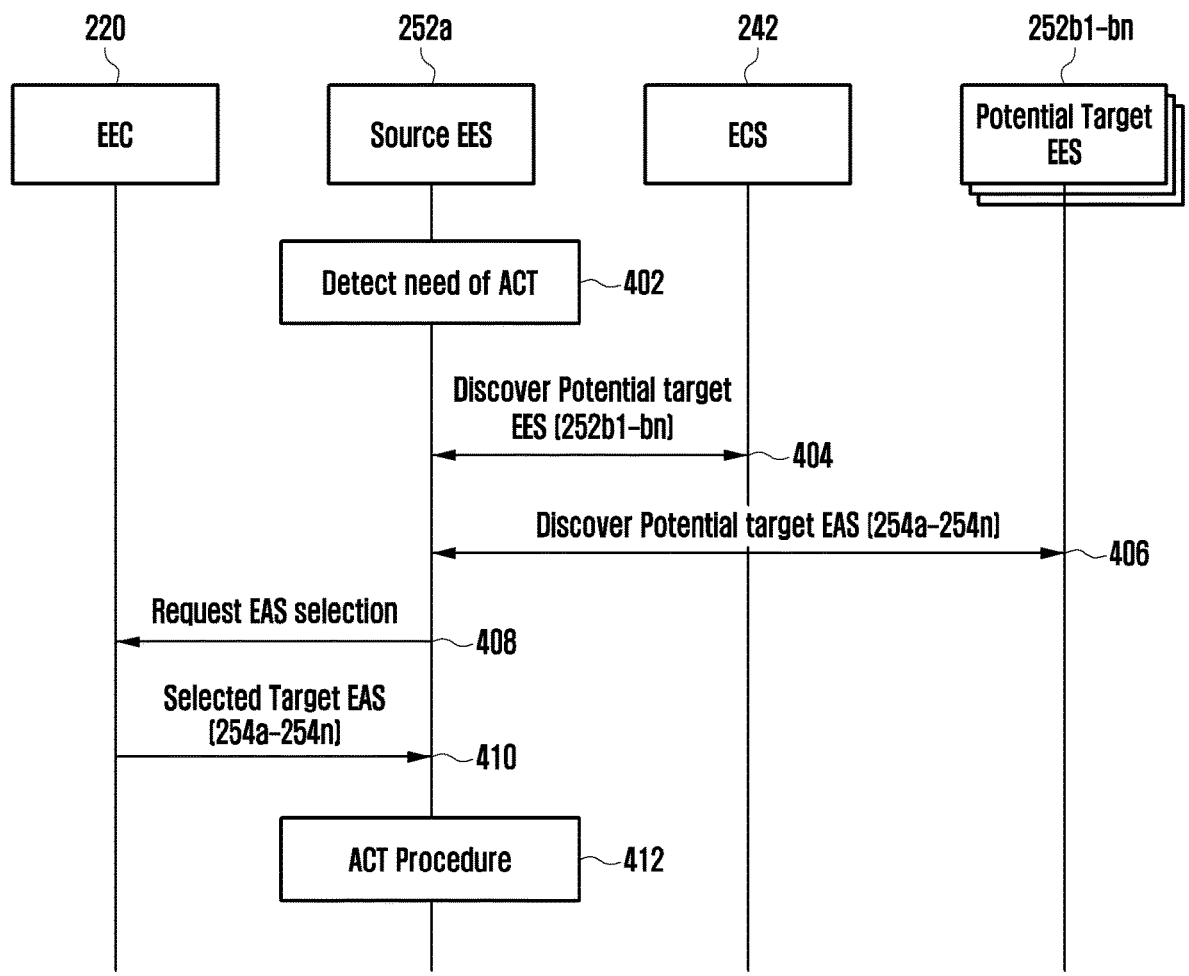
FIG. 4 is a sequence diagram illustrating an example of a source Edge Enabler Server providing the list of potential targets to Edge Enabler Client to select the target Edge Application Server, according to some embodiments as disclosed herein.

FIG. 4 is a sequence diagram illustrating an example of the source Edge Enabler Server (252) providing the list of potential targets to Edge Enabler Client (220) to select the target Edge Application Server (254), according to some embodiments as disclosed herein.

Referring to the non-limiting example of FIG. 4, in some embodiments, the source Edge Enabler Server (252a), upon determining that the service continuity is needed, contacts the Edge Configuration Server (242) to discover the potential target Edge Enabler Servers (254). Further, the source Edge Enabler Server (252) discovers the details of the potential target Edge Application Servers (254) from the potential target Edge Enabler Servers (252b). Once the source Edge Enabler Server (252a) has determined the list of potential target Edge Application Servers (254), it sends the list to the Edge Enabler Client (220) to select the target Edge Application Server (254) from the provided list. Specifically, one example of providing the list of potential targets to select the target EAS comprises the following operations:

At operation 402, the source Edge Enabler Server (252a) detects the need for the application context transfer. As discussed above, in certain embodiments, the need for the application context transfer could be a result of the change in the location of the UE (210) detected by the source Edge Enabler Server (252), with or without the help of the wireless network (240). In some embodiments, the need for the application context transfer could be the result of the request from the source Edge Enabler Server (252) or the request from the Edge Enabler Client itself (220). In some embodiments, the need for the application context transfer is based on certain events monitored by the Edge Enabler Server (252), such as an overload in the source Edge Application Server (254). The above-mentioned scenarios are a non-exhaustive set of examples of how the source Edge Enabler Server (252) detects the need for providing service continuity.

At operation 404, upon determining the need for application context transfer, the source Edge Enabler Server (252a) sends a request to the Edge Configuration Server (242) to determine the potential target Edge Enabler Servers (252b) serving the Edge Application Server (254) which the Edge Enabler Client (220) requires.

At operation 406, once the source Edge Enabler Sever (252a) has the list of potential target Edge Enabler Servers (252b), then the source Edge Enabler Sever (252a) contacts each of the potential target Edge Enabler Servers (252a) to obtain the details of the Edge Application Server (254) and creates the list of the potential target Edge Application Servers (254).

At operation 408, once the source Edge Enabler Server (252a) has the list of potential target Edge Application Servers (254), the source Edge Enabler Server (252a) shares this list, including the details of the Edge Application Servers (254) with the Edge Enabler Client (220) to select the target Edge Application Server (254). In various embodiments, the source Edge Enabler Server (252a) skips operation 406 and shares the list of potential target Edge Enabler Servers (252b) to the Edge Enabler Client (220).

In certain embodiments, if the list of the potential target Edge Application Servers (254) is shared by the source Edge Enabler Server (252a), then the Edge Enabler Client (220) selects the target Edge Application Server (254) at 410. Otherwise, if the list of potential target Edge Enabler Servers (252b) is shared by the source Edge Enabler Server (252a), then the Edge Enabler Client (220) performs the EAS discovery procedures with the potential target Edge Enabler Servers (252b) and further selects the target Edge Application Server (254) at 410.

At operation 412, once the target Edge Application Server (254) is selected by the Edge Enabler Client (220), taking into account the user and Application Client (218) preferences and the KPI requirements, the Edge Enabler Client (220) shares the details of the target Edge Application Server (254) with the source Edge Enabler Server (252a). The source Edge Enabler Server (252a) takes the information provided in operation 410 into account and initiates application context transfer procedures with the selected target Edge Application Server (252b).

Figure 5:
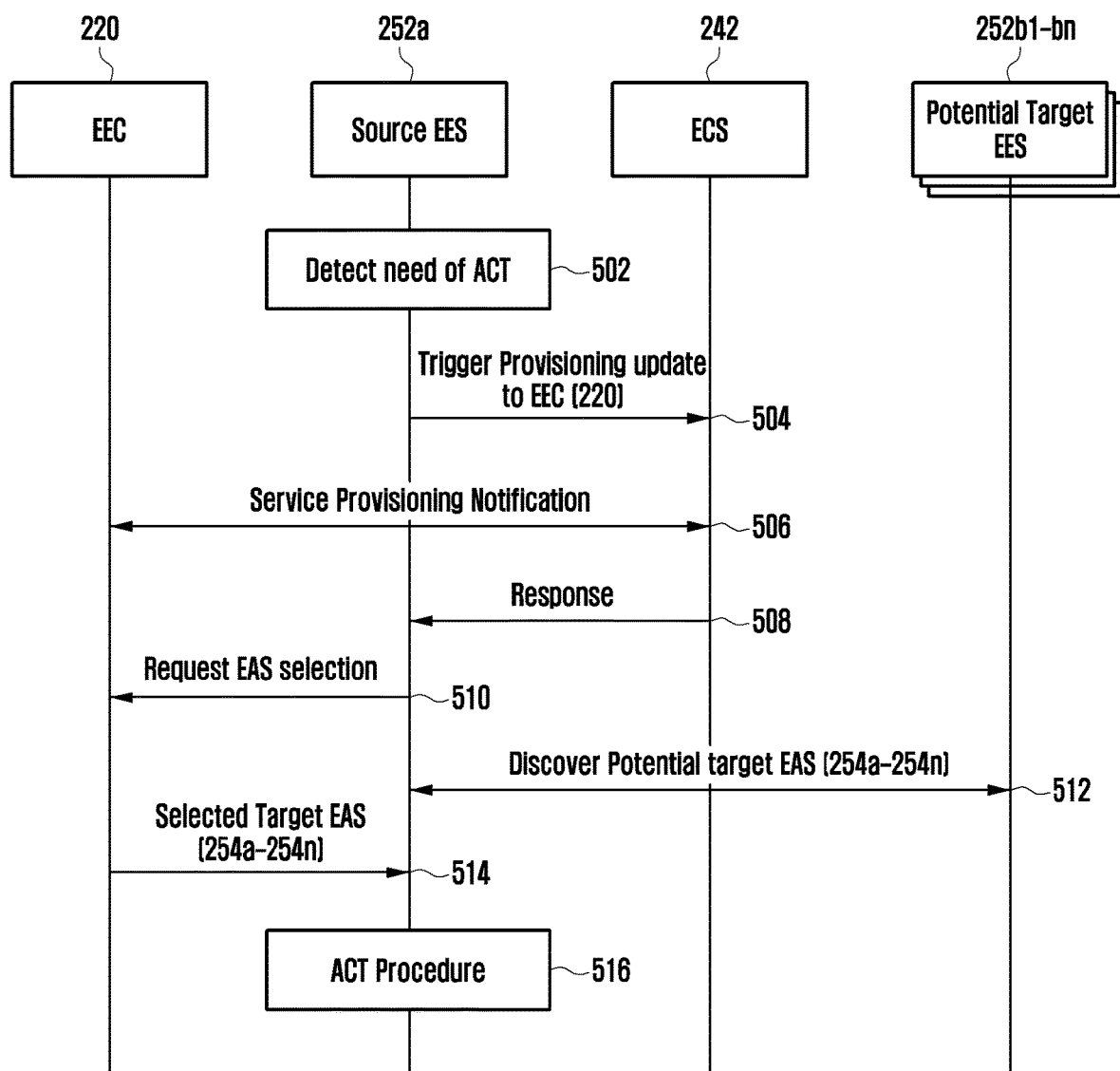
FIG. 5 is a sequence diagram illustrating an example of an Edge Enabler Server triggering the Edge Configuration Server to send Service provisioning notification to the Edge Enabler Client and then requesting the Edge Enabler Client to select the target Edge Application Server according to some embodiments as described herein.

FIG. 5 is a sequence diagram illustrating an example of the source Edge Enabler Server (252a) triggering the Edge Configuration Server (242) to send service provisioning update with the potential target Edge Enabler Servers (252b) to the Edge Enabler Client (220), according to the embodiments as disclosed herein.

Referring to the illustrative example of FIG. 5, the source Edge Enabler Server (252a), upon determining that the service continuity is needed, contacts the Edge Configuration Server (242) to push the service provisioning update notification to the Edge Enabler Client (220). This service provisioning update notification will include a list of potential target Edge Enabler Servers (252b). Further the source Edge Enabler Server requests the Edge Enabler Client (220) to provide the selected Edge Application Server (254) for the application context transfer. The request from the source Edge Enabler Server (252a) triggers the EAS discovery by the Edge Enabler Client (220) to the potential target Edge Enabler Servers (254). The Edge Enabler Client (220) selects the target Edge Application Server (254) from the available servers and provide this information to the source Edge Enabler Server (252a) to initiate the application context transfer. An example of the above-summarized exchange is provided with reference to the operations described below At operation 502, the source Edge Enabler Server (252a) detects the need for the application context transfer. As discussed above in certain embodiments, the need for the application context transfer could be a result of a change in a location of the UE (210) detected by the source Edge Enabler Server (252), with or without the help of the wireless network (240). In various embodiments, the need for the application context transfer could be a result of a request from the source Edge Enabler Server (252) or a request from the Edge Enabler Client itself (220). In some embodiments, the need or the application context transfer is based on certain events monitored by the Edge Enabler Server (252), such as an overload at the source Edge Application Server (254). The above-mentioned scenarios are just some examples of how the source Edge Enabler Server (252) detects the need for service continuity.

At operation 504, upon determining the need for application context transfer, the source Edge Enabler Server (252a) sends the request, to the Edge Configuration Server (242) to push the service provisioning notification the Edge Enabler Client (220). The request includes the EAS information such as EAS ID and can include a future location of the UE where it'd need the target Edge Application Server (254).

At operation 506, the Edge Configuration Server (242) upon receiving this request from the source Edge Enabler Server (252a), determines the provisioning information containing the list of potential target Edge Enabler Servers (252b), and notifies to the Edge Enabler Client (220). In an alternate embodiment, the Edge Configuration Server (242) monitors the UE (210) and push the updated service provisioning based on the UE's (210) updated characteristics such as the current location; without the request from the source Edge Enabler Server (252a).

At operation 508, once the Edge Enabler Client (220) is notified, the Edge Configuration Server (242) responds to the source Edge Enabler Server (252a).

At operation 510, the source Edge Enabler Server (252a) sends a request to the Edge Enabler Client (220) to choose the target Edge Application Server (254).

At operation 512, upon receiving the request from the source Edge Enabler Server (252a), the Edge Enabler Client (220) uses the EAS discovery procedures to determine the list of potential target Edge Application Servers (254). The Edge Enabler Client (220) selects the target Edge Application Server (254), taking into account the user and Application Client (218) preferences and the KPI requirements.

At operation 514, the Edge Enabler Client (220) shares the details of the target Edge Application Server (254) including the details of the Edge Enabler Server (252b), with the source Edge Enabler Server (252a).

At operation 516, the source Edge Enabler Server (252a) takes the information provided in operation 514 into account and initiates the application context transfer procedures with the selected target Edge Application Server (254).

In various embodiments, the methods described with reference to FIGS. 3 through 5, may require a real-time interaction between the source Edge Enabler Server (252a) and the Edge Enabler Client (220) for selection of the target Edge Application Server (254). However, such real-time interaction can add a delay in completing the overall service continuity procedure. To avoid this delay, in some embodiments, the Edge Enabler Client (220) configures the target Edge Application Server selection criteria in the source Edge Enabler Server (252a), for all the applications that may require the service continuity in future. Upon detecting the need for application context transfer, the source Edge Enabler Server (252a) uses the target Edge Application Server selection criteria, to discover and select the target Edge Enabler Server (252b) and the target Edge Application Server (254) on its own. The criteria may include application client KPIs, preferred ECSPs, EAS availability conditions (for e.g., available for at least 90 minutes) etc. and are provided by the Edge Enabler Client (220) in an explicit request to the source Edge Enabler Server or as part of the EEC (220) registration details or as part of the EAS discovery request.

If needed, the criteria may simply indicate that the source Edge Enabler Server (252a) can choose the target servers on its own. This can be due to multiple usage scenarios, for e.g., Edge Enabler Client (220) is not aware of any preferences of the user or the Application Client (218), including KPI requirements.

Figure 6:
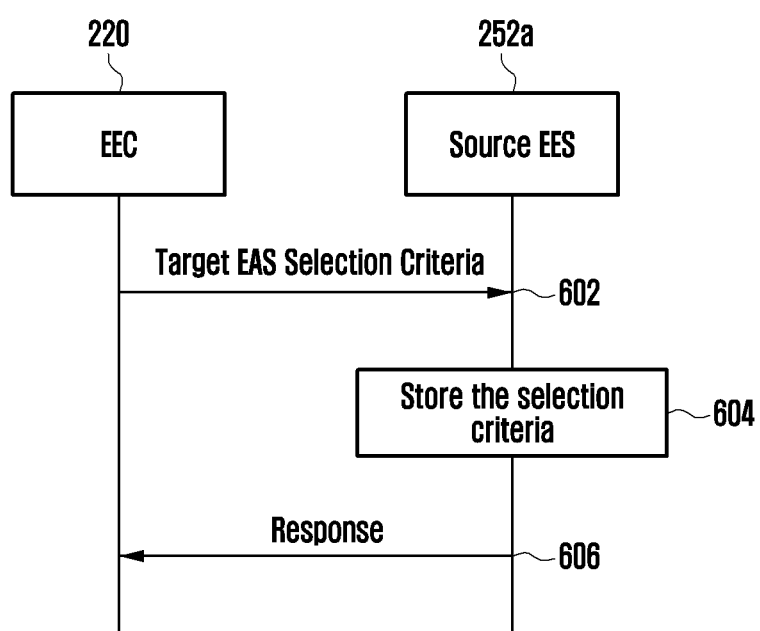
FIG. 6 is a sequence diagram illustrating an example of an Edge Enabler Client configuring a target Edge Application Server selection criteria in the source Edge Enabler Server, according to some embodiments as disclosed herein.

FIG. 6 is a sequence diagram illustrating an example of and Edge Enabler Client (220) configuring the target Edge Application Server selection criteria in the Edge Enabler Server (252a), according to various embodiments as disclosed herein.

FIG. 6 illustrates a procedure wherein the Edge Enabler Client (220) is providing the selection criteria to the source Edge Enabler Server (252a), wherein the procedure comprises the operations described below.

The Edge Enabler Client (220) prepares the selection criteria to select the target Edge Application Server (254) for applications that may require service continuity. The selection criteria may be for a particular application or may apply to the multiple applications in the UE (210). The Edge Enabler Client (220) utilizes the preferences of the user and Application Clients (218), including the KPI requirements of the Application Clients (218).

Once prepared, the Edge Enabler Client (220) shares the selection criterion with the source Edge Enabler Server (252a) at operation 602. In an alternate embodiment, the selection criteria may be shared by the Edge Enabler Client (220) as part of a registration request to the source Edge Enabler Server (252a). In an alternate embodiment, the selection criteria may be shared by the Edge Enabler Client (220) as part of EAS discovery request to the source Edge Enabler Server (252a).

The source Edge Enabler Server (252a) stores the received criteria at operation 604.

At operation 606, the source Edge Enabler Server (252a) sends a response confirming receipt of the selection criteria. Further, the Edge Enabler Server (252a) uses the criteria to determine the target Edge Application Server (254) in scenarios where service continuity is needed.

Figure 7:
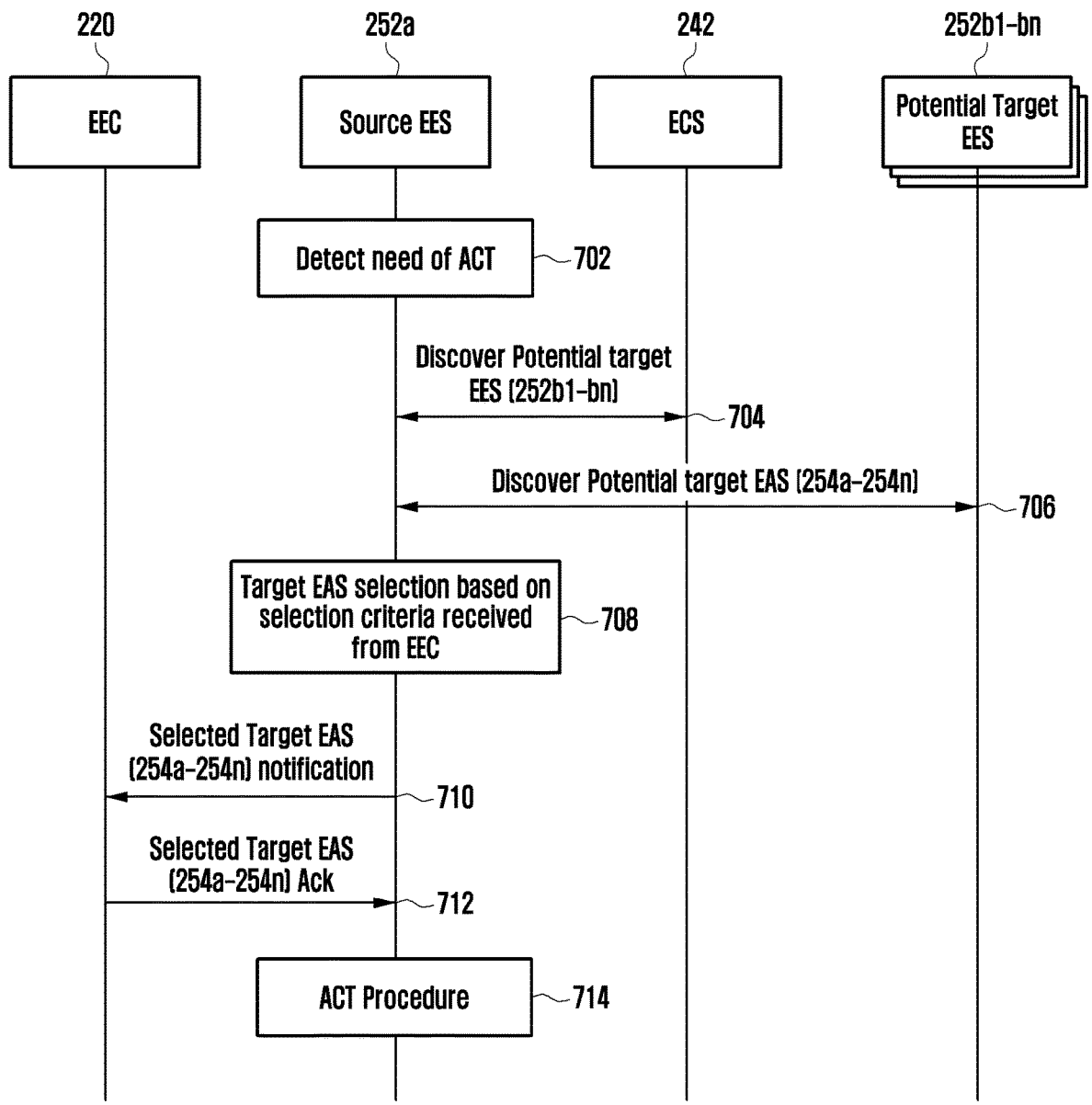
FIG. 7 is a signalling diagram illustrating an example of a source Edge Enabler Server selecting the target Edge Application Server based on the selection criteria received from the Edge Enabler Client, according to some embodiments as disclosed herein.

FIG. 7 is a signalling diagram illustrating an example of the source Edge Enabler Server (252a) selecting the target Edge Application Server (254) based on the selection criteria received from the Edge Enabler Client (220), according to certain embodiments as disclosed herein.

FIG. 7 illustrates a procedure wherein the source Edge Enabler Server (252a), upon determining that the service continuity is needed, contacts the Edge Configuration Server (242) to discover the potential target Edge Enabler Servers (254). The source Edge Enabler Server (252a) discovers the details of the potential target Edge Application Servers (254) from the potential target Edge Enabler Servers (252b). Once the source Edge Enabler Server (252a) has determined the list of potential target Edge Application Servers (254), it also selects the target EAS (254) based on the selection criteria received from EEC (220) and notifies the details of the selected target EAS (254) and the EES at which the selected target EAS is registered at i.e., the target EES to EEC (220). In certain embodiments, this procedure comprises the operations described below.

At operation 702, the source Edge Enabler Server (252a) detects the need for the application context transfer. As discussed above, in certain embodiments, the need for the application context transfer could be a result of a change in a location of the UE (210) detected by the source Edge Enabler Server (252) with or without the help of the wireless network (240). In various embodiments, the need for the application context transfer could be a result of a request from the source Edge Enabler Server (252) or a request from the Edge Enabler Client itself (220). In some embodiments, the need of the application context transfer is based on certain events monitored by the Edge Enabler Server (252), like overload in source Edge Application Server (254). The above-mentioned scenarios are just some examples of how the source Edge Enabler Server (252) detects the need for service continuity.

At operation 704, upon determining the need for the application context transfer, the source Edge Enabler Server (252a) sends the request to the Edge Configuration Server (242) to determine the potential target Edge Enabler Servers (252b), serving the Edge Application Server (254) that the Edge Enabler Client (220) requires. If the Edge Enabler Server (252a) already has the details of potential target Edge Enabler Servers (252b), then this operation may be skipped.

At operation 706, once the source Edge Enabler Sever (252a) has the list of potential target Edge Enabler Servers (252b), it contacts each of the potential target Edge Enabler Servers (252b) to obtain the details of the Edge Application Server (254) creating the list of potential target Edge Application Servers (254). If the Edge Enabler Server (252a) already has the details of potential target Edge Application Servers (254), then this operation may be skipped.

At operation 708, once the Edge Enabler Server (252a) has the list of potential target Edge Application Servers (254), it selects the optimal target Edge Application Server (254) taking into account the user and Application Client (218) preferences and the KPI requirements received as selection criteria from the EEC (220).

At operation 710, the Source Edge Enabler Server (252a) sends the information of the selected target Edge Application Server (254) and the EES at which the selected target EAS is registered at i.e., the target EES to the Edge Enabler Client (220).

At operation 712, the Edge Enabler Client (220) provides the acknowledgement to the source Edge Enabler Server (252a) that could trigger the application context transfer procedures. In an alternate embodiment, the Edge Enabler Server (252a) can trigger the application context transfer procedures without an acknowledgement from the Edge Enabler Client (220).

At operation 714, the source Edge Enabler Server (252a) initiates the application context transfer procedures with the selected target Edge Application Server (254). In an alternate embodiment, this step can occur without the involvement of the Edge Enabler Server (252a), In some embodiments, operation 714 can be performed immediately after operation 708 in order to minimize a service disruption during continuity as per the service requirement.

In certain embodiments, the methods as depicted in FIG. 4 and FIG. 7 can be used in combination. In such scenario, the source Edge Enabler Server (252a) selects the target Edge Application Server (254) if it has received the selection criteria from the Edge Enabler Client (220) (method as proposed in FIG. 6) or requests the Edge Enabler Client (220) to select the target Edge Application Server from the list of potential target Edge Application Servers (method as proposed in FIG. 3).

Figure 8:
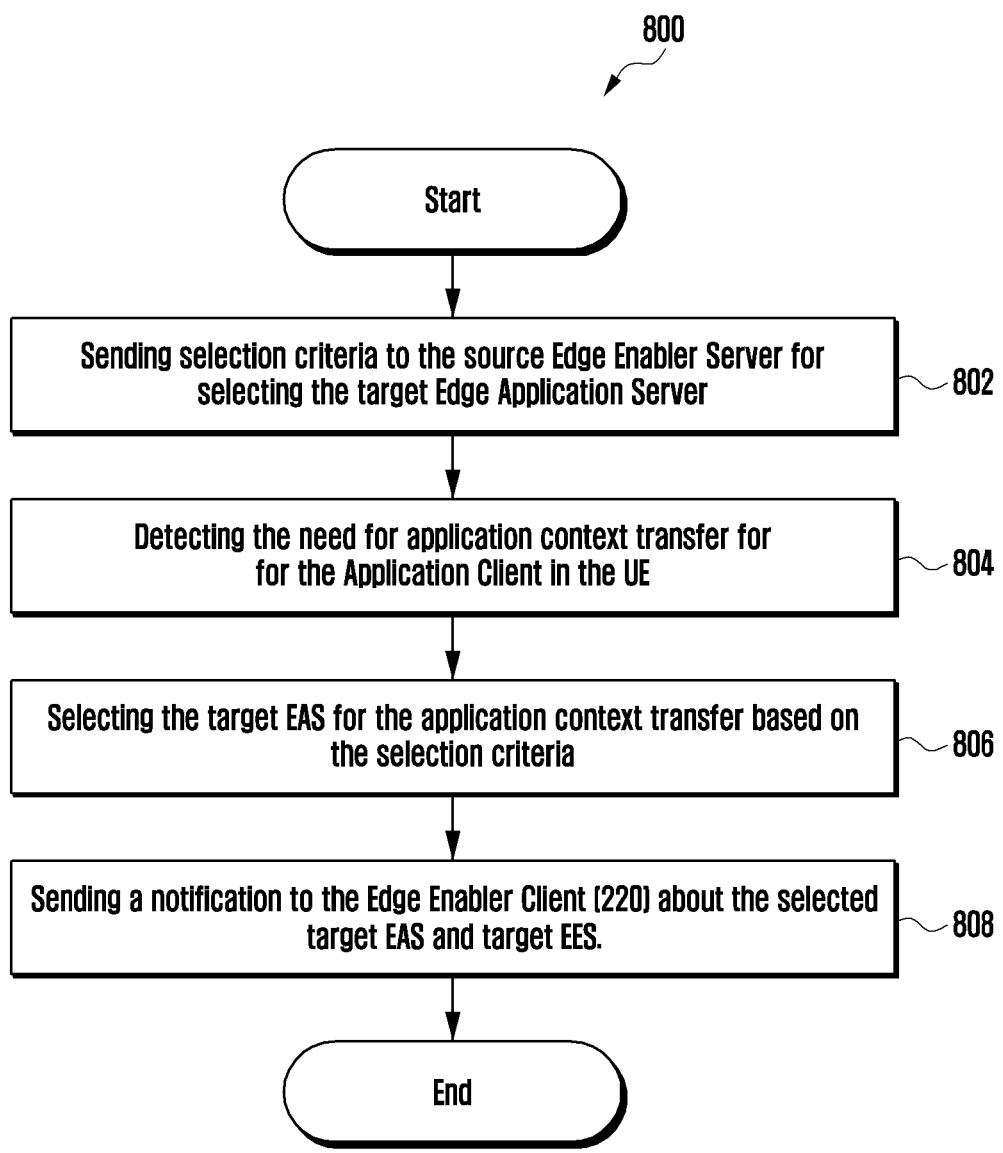
FIG. 8 is a flow diagram illustrating an example method of selecting an optimal target Edge Application Server based on the selection criteria stored at the Edge Enabler Server, according to certain embodiments as disclosed herein.

FIG. 8 is a flow diagram illustrating an example method of selecting the optimal target Edge Application Server (254) based on the selection criteria stored at the Edge Enabler Server (252a), according to certain embodiments as disclosed herein.

At operation 802, the Edge Enabler Client (EEC) (220) sends the selection criteria to the source Edge Enabler Server (252a) for selecting the target Edge Application Server (254). Further the source Edge Enabler Server (252a) stores the selection criteria.

At operation 804, the source Edge Enabler Server (252a) detects the need for the application context transfer for the application client (218) in the UE (210).

At operation 806, the source Edge Enabler Server (252a) selects the target EAS for the application context transfer based on the selection criteria.

At operation 808, the source Edge Enabler Server (252a) sends a notification to the Edge Enabler Client (220) about the selected target EAS.

Figure 9:
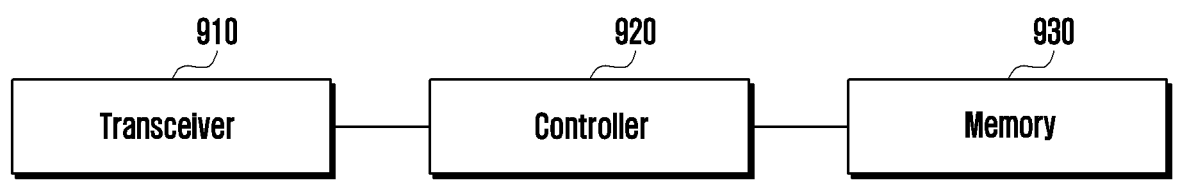
FIG. 9 is a block diagram illustrating a source edge enabler server according to certain embodiments of the present disclosure.

FIG. 9 is a block diagram illustrating an example of source edge enabler server according to certain embodiments of the present disclosure.

Referring to the illustrative example of FIG. 9, the source edge enabler server may include a transceiver (910), a controller (or a processor) (920), and a memory (930).

The transceiver (910) is responsible for communication with other network entities. The transceiver (910) may communicate information, signals, or messages with other network entities, for example, an edge enabler client in a user equipment (UE).

The controller (920) may control to: receive, from an edge enabler client in the UE via the transceiver (910), a selection criteria for selecting the target edge application server, determine a need for an application context transfer for an application client in the UE, select the target edge application server for the application context transfer based on the selection criteria received from the edge enabler client, and transmit via the transceiver (910), to the edge enabler client, a notification about the selected target edge application server.

The memory (930) may store the information, signals, or messages received from the other network entities. The memory (930) may also store information generated by the controller (920).

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like without departing from the scope of the invention.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a source edge application server in an edge computing system, the method comprising:
    transmitting, to a source edge enabler server, information on selection criteria for a target edge application server selection; and
    receiving, from the source edge enabler server, a response with information on a target edge application server for an application context transfer,
    wherein the target edge application server for the application context transfer is identified according to the information on the selection criteria, and
    wherein the information on the selection criteria includes information indicating that a service continuity is required and at least one of application client expected key performance indicators (KPIs) or application client minimum KPIs.

2. The method of claim 1, wherein the information on the selection criteria is shared as part of an edge application server discovery request to the source edge enabler server.

3. The method of claim 1, wherein the information on the selection criteria is related to one of a particular application or a plurality of applications.

4. The method of claim 1, wherein the target edge application server for the application context transfer is identified based on information on at least one potential target edge application server pre-stored in the source edge enabler server.

5. The method of claim 1, wherein the target edge application server for the application context transfer is identified based on address information of at least one potential target edge enabler server received from an edge configuration server and information on at least one potential target edge application server received from the at least one potential target edge enabler server.

6. A method performed by a source edge enabler server in an edge computing system, the method comprising:
    receiving, from a source edge application server, information on selection criteria for a target edge application server selection;
    identifying information on a target edge application server selected for an application context transfer based on the selection criteria; and
    transmitting, to the source edge application server, a response with the information on the target edge application server for the application context transfer,
    wherein the information on the selection criteria includes information indicating that a service continuity is required and at least one of application client expected key performance indicators (KPIs) or application client minimum KPIs.

7. The method of claim 6, wherein the information on the selection criteria is shared as part of an edge application server discovery request from the source edge application server.

8. The method of claim 6, wherein the information on the selection criteria is related to one of a particular application or a plurality of applications.

9. The method of claim 6, wherein the target edge application server for the application context transfer is identified based on information on at least one potential target edge application server pre-stored in the source edge enabler server.

10. The method of claim 6, wherein the target edge application server for the application context transfer is identified based on address information of at least one potential target edge enabler server received from an edge configuration server and information on at least one potential target edge application server.

11. A source edge application server in an edge computing system, the source edge application server comprising:
    a transceiver; and
    a controller configured to:
    transmit, to a source edge enabler server via the transceiver, information on selection criteria for a target edge application server selection; and
    receive, from the source edge enabler server via the transceiver, a response with information on a target edge application server for an application context transfer,
    wherein the target edge application server for the application context transfer is identified according to the information on the selection criteria, and
    wherein the information on the selection criteria includes information indicating that a service continuity is required and at least one of application client expected key performance indicators (KPIs) or application client minimum KPIs.

12. The source edge application server of claim 11, wherein the information on the selection criteria is shared as part of an edge application server discovery request to the source edge enabler server.

13. The source edge application server of claim 11, wherein the information on the selection criteria is related to one of a particular application or a plurality of applications.

14. The source edge application server of claim 11, wherein the target edge application server for the application context transfer is identified based on information on at least one potential target edge application server pre-stored in the source edge enabler server.

15. The source edge application server of claim 11, wherein the target edge application server for the application context transfer is identified based on address information of at least one potential target edge enabler server received from an edge configuration server and information on at least one potential target edge application server received from the at least one potential target edge enabler server.

16. A source edge enabler server in an edge computing system, the source edge enabler server comprising:
    a transceiver; and
    a controller configured to:
    receive, from a source edge application server, information on selection criteria for a target edge application server selection;

identify information on a target edge application server selected for an application context transfer based on the selection criteria; and transmit, to the source edge application server, a response with the information on the target edge application server for the application context transfer, wherein the information on the selection criteria includes information indicating that a service continuity is required and at least one of application client expected key performance indicators (KPIs) or application client minimum KPIs.

17. The source edge enabler server of claim 16, wherein the information on the selection criteria is shared as part of an edge application server discovery request from the source edge application server.

18. The source edge enabler server of claim 16, wherein the information on the selection criteria is related to one of a particular application or a plurality of applications.

19. The source edge enabler server of claim 16, wherein the target edge application server for the application context transfer is identified based on information on at least one potential target edge application server pre-stored in the source edge enabler server.

20. The source edge enabler server of claim 16, wherein the target edge application server for the application context transfer is identified based on address information of at least one potential target edge enabler server received from an edge configuration server and information on at least one potential target edge application server.

* * * * *